United States Patent [19]

Brooks et al.

[11] Patent Number: 5,006,942
[45] Date of Patent: Apr. 9, 1991

[54] RIGID MAGNETIC DATA STORAGE DISK ASSEMBLY WITH GROOVED SPACER

[75] Inventors: Peter E. Brooks; Kimberly G. Jan, both of Rochester, Minn.

[73] Assignee: International Business Machines Corporation, Armonk, N.Y.

[21] Appl. No.: 339,282

[22] Filed: Apr. 17, 1989

[51] Int. Cl.⁵ ............................................. G11B 17/08
[52] U.S. Cl. .................................................. 360/98.08
[58] Field of Search .................... 360/98.08, 99.12, 135

[56] References Cited

U.S. PATENT DOCUMENTS 4,819,105 4/1989 Edwards .......................... 360/98.08

Primary Examiner—A. J. Heinz
Attorney, Agent, or Firm—Richard E. Billion; Robert W. Lahtinen

[57] ABSTRACT

A system for clamping and retaining a stack of rigid magnetic disks is shown using disk spacer rings with an annular groove in the outer cylindrical surface. A concentrated axial load is applied to the stack by support surfaces which overlie the grooved portions of the spacers. The concentrated load is only partially distributed over the radial extent of the spacers with respect to the disks at the axial ends of the stack to resist coning or cupping of such end disks, while the force distribution approaches a uniform loading with respect to inner disks of the stack to retain the undistorted, planar orientation of such inner disks. The grooved spacers also provide a surface which can be used to engage and manipulate the disk assembly during manufacture of the drive.

9 Claims, 2 Drawing Sheets

RIGID MAGNETIC DATA STORAGE DISK ASSEMBLY WITH GROOVED SPACER

FIELD OF THE INVENTION

This invention pertains to rigid magnetic disk drives and more particularly to a disk assembly structure for such devices.

BACKGROUND OF THE INVENTION

Rigid magnetic data disk storage devices achieve high volumetric storage densities by utilizing the maximum number of data surfaces and high areal storage densities on the disk surfaces. The height of the disk stack is limited by the form factor or industry standard dimensions that disk drives must adhere to in order to achieve commercial acceptance. The drive can maximize the number of data surfaces by utilizing the total form factor height for the disk stack. Spacing between disks can be reduced to the minimum spacing required for the functioning of the transducer head, its suspension and the actuator arm to which the head-suspension assembly is mounted. A further step is to reduce the thickness of the data disk.

When these parameters have been optimized to the current state of the art, the ability of the disk clamping within the disk stack to maintain the disks flat, parallel and free of deformation becomes critical. For a given clamping force on a disk stack, concentrated loads will tend to cause more severe disk deformation than distributed loads. One typical distortion mode is coning (or cupping) of the disks. The distortion problem has been observed on industry standard thickness disks and is more severe on reduced thickness thin disks. The coning of the disks is detrimental because it affects the fly height of the heads. With the higher bit densities and lower fly heights required by high density thin disks, the flatness of the disks in the disk pack assembly becomes increasingly important.

SUMMARY OF THE INVENTION

The disk spacer and disk stack design of this invention solves two problems, disk distortion due to concentrated disk stack clamping forces and low residual clamp loads of a single spring element system.

The disk spacer is formed with a centrally located radial groove. The width and depth of the groove depend on factors such as disk thickness, load application point and clamping force. The groove allows the spacer to behave similar to a cantilever spring when a load is applied adjacent the outer diameter of the spacer.

In a disk pack assembly, a concentrated load is applied to the top disk and the bottom disk. The grooved spacer, by acting like a spring, causes this applied concentrated load to become a distributed load more rapidly than if the spacer did not possess the groove. The distributed load is highest at the outside diameter and decreases toward the inside diameter of the spacer ring. This distribution of the concentrated load will counterbalance the natural deflection of the disk, permitting the top and bottom disks to be flat when clamped in the pack assembly.

The concentrated load tends to distribute itself further as it is transferred to the center disks and spacers in the pack, becoming nearly a uniformly distributed load. This load does not deflect the spacer as much as a concentrated load because more of the load is acting on a part of the spacer that is not a spring element. Thus, the center disks in the pack assembly remain flat.

DETAILED DESCRIPTION

Figure 1:
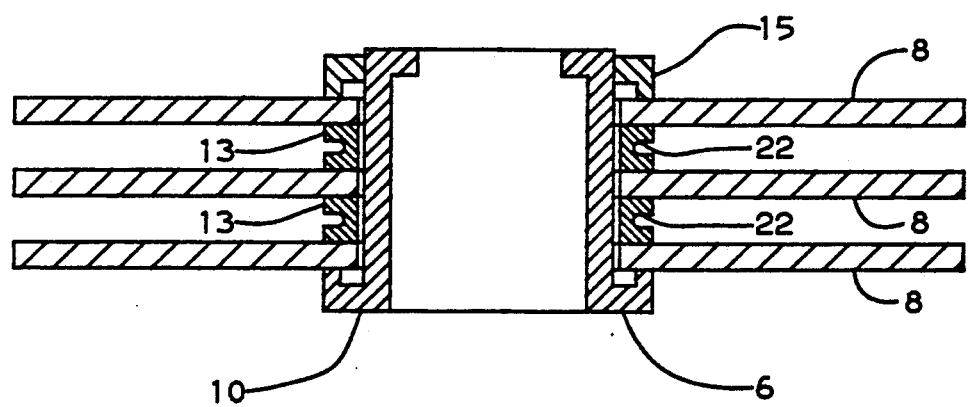
FIG. 1 is a vertical section of a hub-disk stack assembly illustrating the structure of the invention in the environment of a three disk stack.

The disk assembly structure is illustrated in FIG. 1 as a three disk stack mounted on a hub 6. The hub 6 includes a space 7 concentrically within the stack of disks 8 which houses the spindle motor (not shown). In practice the hub 6 not only supports the disks 8, but also functions as the housing for the spindle motor rotor. The hub 6 has a lower flange 10 which presents an annular support surface 11 (FIG. 2) upon which the lower most disk 8 of the stack is supported. Intermediate each adjoining pair of disks is a spacer ring 13 and at the top of the stack a clamp ring 15 presents a second, downwardly facing support surface 16. The stack of disks 8 and spacer rings 13 are clamped and held captive between the hub annular support surface 11 and the clamp ring annular support surface 16.

The clamp ring 15 has an inner diameter 18 that is slightly smaller than the outer diameter 17 of the top of hub 6 and is assembled to the hub by being heated to expand the inner diameter 18, being placed about the hub outer surface 17 while simultaneously applying an axial force to the stack and allowed to cool to establish an interference fit with the hub outer surface that clamps the disks 8 and spacers 13 in position and maintains a desired axial retaining force upon the disk stack. The clamping technique is taught in U.S. Pat. No. 4,639,802.

It will also be noted that a clearance is maintained between the inner diameter 20 of the disks, the inner diameter 21 of the spacers and the outer substantially cylindrical wall surface 17 of the hub 6. This avoids the imposition of forces and dislocations that may occur as a result of physical contact of such parts during temperature changes.

The disk spacers 13 are provided with an annular groove 22, centrally positioned with respect to the outer cylindrical surface 23 and radially inwardly extending therefrom. The width and depth of the groove 22 are tailored to the disk thickness, axial load application location and clamping force. When a load is applied near the outer diameter of spacer 13, the groove 22 permits the spacer to function in a manner similar to a cantilever spring.

With the disk stack in the assembled condition, a concentrated load is applied to the disk stack between the hub flange annular support surface 11 and the clamp ring annular support surface 16. The grooved spacer 13, functioning like a spring, causes the concentrated load to become a distributed load more rapidly than would be possible if a solid ring shaped spacer were used. The distributed load is highest at the spacer ring outer diameter 23 and decreases toward the spacer inner diameter 21 to cause the concentrated load to counterbalance the natural deflection of the disk 8 at each axial end of the stack. The top and bottom disks of the stack are thereby permitted to remain flat and parallel to the other disks of the stack, overcoming the coning or cupping distortion common to the clamping of axially aligned clamped disks.

Although the invention is illustrated for simplicity in an environment of a three disk stack, actual practice will see the technique applied to much larger stacks such as those including 8, 10 or 12 disks, using the full height of the form factor, close spacing between disks and reduced thickness disk media. The concentrated load tends to be further distributed as it is transferred to disks at the center of the stack to approach a uniformly distributed load. The more uniformly distributed load does not deflect the spacer as much as a concentrated load since more of the load is acting on a part of the spacer that is not functioning as a spring element. Thus disks in the center of the stack maintain the flat planar configuration.

Figure 2:
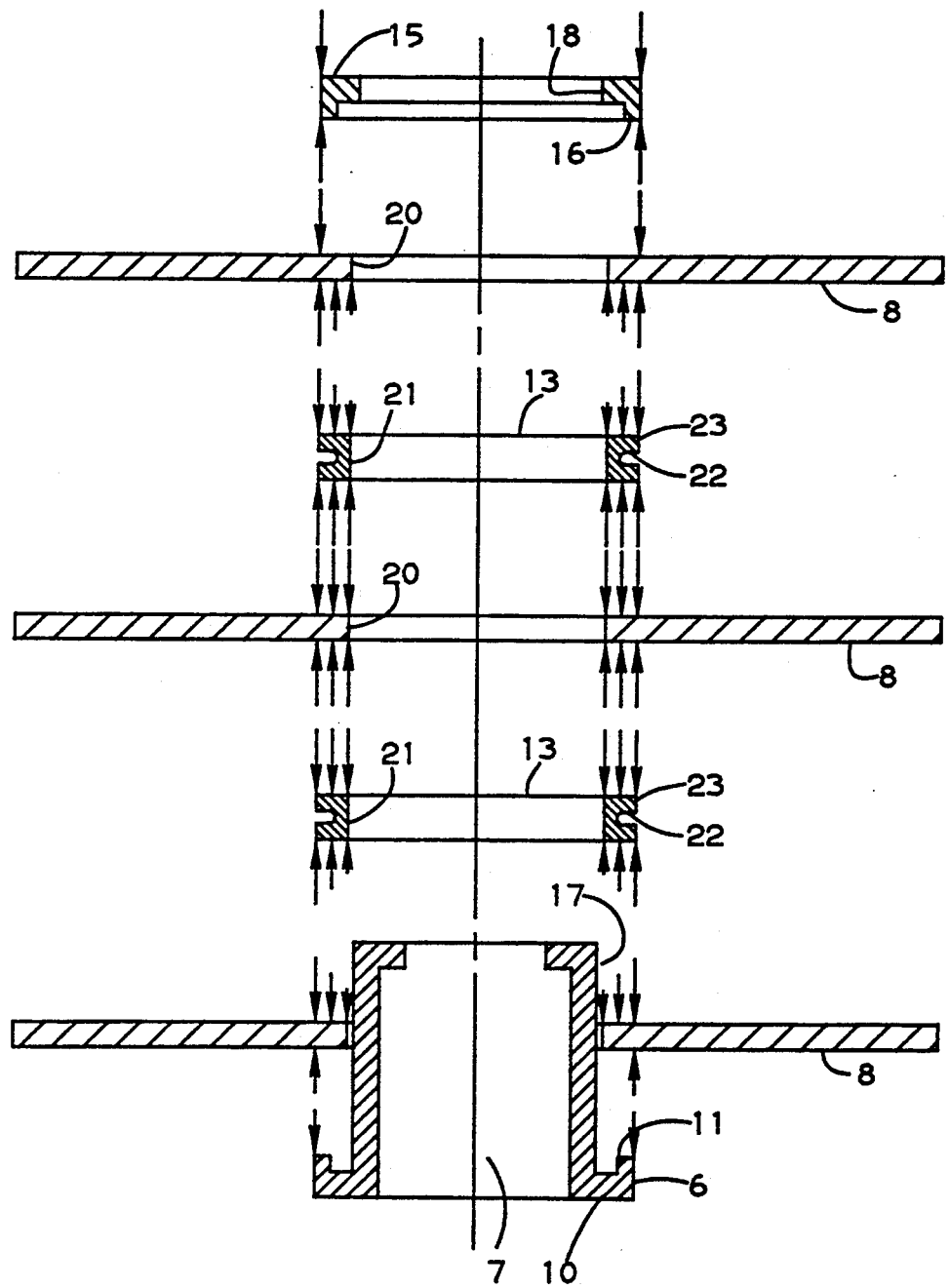
FIG. 2 is an exploded vertical section view of the hub-disk stack assembly of FIG. 1 showing the clamping load distribution within the clamped components of the disk stack.

The load distribution is illustrated by the position and length of the arrows in FIG. 2. The support surfaces 11, 16 respectively of the hub 6 and the clamp ring 13 impart a concentrated load largely at the outside diameters of the support surfaces. The grooved spacer rings 13 cause the concentrated load at the axial ends of the stack to be distributed from the outer radius to the inner radius of the spacer through the spring like function of the annular spacer projections adjoining the groove. As the axial compressive load is transferred to the disks beyond those at the axial ends of the stack, the loading approaches a uniform distribution from the outside diameter to the inside diameter of the spacer ring 13. Thus the use of the grooved spacers overcomes the tendency of the disks at the axial ends of the stack to be distorted through coning or cupping and does not impart a distortion to disks at the center of the stack to permit the flat planar disposition of those disks to be maintained.

As shown in the specific example that has been described, the depth of the groove 22 is 1 millimeter and the radial width of the clamp ring and hub annular support surfaces is 1 millimeter. Thus in the example, the groove and the support surfaces are aligned and coextensive; however, this common dimension is exemplary only and would not necessarily be applicable to other combinations of disk thickness and load magnitude and location of application.

The grooved spacer rings 13 also provide a cylindrical surface 23 with a locating groove 22 that can be used for automated handling and manipulating of the disk stack assembly during manufacture of the head-disk assembly.

While the invention has been particularly shown and described with reference to a preferred embodiment thereof, it will be understood by those skilled in the art that various changes in form and details may be made therein without departing from the spirit and scope of the invention.

What is claimed is:

1. A rigid magnetic data storage disk assembly supporting a plurality of axially aligned disks which have an opening therein, which forms an inner cylindrical surface on each said disk and having an inner diameter near the opening, said storage disk assembly comprising
   a hub having a lower flange presenting a first annular support surface at one axial end of said plurality of disks;
   an annular spacer positioned between and separating each adjoining pair of disks of said plurality of disks and adjoining the inner diameter of said disks;
   each said spacer having an inner cylindrical surface and an outer cylindrical surface, each spacer having an annular groove extending radially inward from the outer cylindrical surface;
   clamping means for said plurality of disks,
   said clamping means presenting a second annular support surface axially aligned with said first annular support surface, said clamping means positioned at the other axial end of said plurality of disks; and
   connecting means securing said clamping means to said hub to compressively retain said plurality of disks and said spacers between said first and second annular support surfaces with the grooved portions of said spacers axially aligned between said first and second annular support surfaces.

2. The rigid magnetic data storage disk assembly of claim 1 wherein said plurality of disks and said spacers are compressively retained with the inner cylindrical surfaces of said plurality of disks and said spacers separated from said hub, whereby the hub does not contact the inner cylindrical surfaces of said disks or spacers during expansion and contraction induced by thermal change.

3. The rigid magnetic data storage disk assembly of claim 2 wherein annular grooves in each of said annular spacers have a radial depth at least as great as the radial dimension of said first and second annular support surfaces.

4. The rigid magnetic data storage disk assembly of claim 3 wherein said clamping means is an annular clamp ring and said connecting means comprises a thermal shrink fit connection between said annular clamp ring and said hub.

5. A rigid magnetic data storage disk assembly comprising
   a plurality of at least three axially aligned disks which form a disk stack, each disk having an opening therein and having an inner diameter near said opening;
   an annular spacer positioned between and separating each adjoining pair of disks of said plurality of disks and adjoining the inner diameter of said disks, said annular spacer having an outer periphery;
   an annular groove extending radially inward from the outer periphery of said annular spacer to form a pair of projecting ring portions separated by said groove formed in at least the spacers separating the last two disks at each axial end of said disk stack;
   first and second clamping means positioned at opposite axial ends of said disk stack and presenting axially aligned support surfaces facing one another and clamping said axially aligned disks and said spacers therebetween; and
   connecting means for interconnecting said first and second clamping means and maintaining a compressive retaining force on said disk stack.

6. The rigid magnetic data storage disk assembly of claim 5 wherein said annular groove is formed in the outer periphery of each spacer ring that separates adjoining disks of said plurality of disks.

7. The rigid magnetic data storage disk assembly of claim 6 wherein said first clamping means comprises a hub with a portion that extends concentrically within said disk stack.

8. The rigid magnetic data storage disk assembly of claim 7 wherein said second clamping means includes a clamp ring and said connecting means is a thermal shrink fit connection between said clamp ring and said hub.

9. The rigid magnetic data storage disk assembly of claim 8 wherein said first and second clamping means axially aligned support surfaces are axially aligned with the annular grooves in said annular spacers.

* * * * *